United States Patent [19]

Gottschalk et al.

[11] Patent Number: 5,296,563
[45] Date of Patent: Mar. 22, 1994

[54] PREPARATION OF POLYPHENYLENE ETHER/POLYAMIDE MOLDING MATERIALS

[75] Inventors: Axel Gottschalk; Robert Weiss, both of Ludwigshafen; Klaus Muehlbach, Gruenstadt; Carola Hedtmann-Rein, Hirschberg; Robert Heinz, Mannheim, all of Fed. Rep. of Germany

[73] Assignee: BASF Aktiengesellschaft, Ludwigshafen, Fed. Rep. of Germany

[21] Appl. No.: 994,255

[22] Filed: Dec. 21, 1992

[30] Foreign Application Priority Data

Dec. 21, 1991 [DE] Fed. Rep. of Germany ....... 4142577

[51] Int. Cl.$^5$ .................... C08G 65/48; C08G 71/04; C08G 77/10; C08L 71/12
[52] U.S. Cl. ................................. 525/397; 524/538; 525/66; 525/133; 525/152; 525/391; 525/392; 525/395
[58] Field of Search ................. 525/397, 391, 66, 133, 525/392, 395, 152

[56] References Cited

U.S. PATENT DOCUMENTS

| | | | |
|---|---|---|---|
| 4,339,376 | 7/1982 | Kasahara et al. | 524/116 |
| 4,873,276 | 10/1989 | Fujii et al. | 524/153 |
| 4,877,847 | 10/1989 | Masu et al. | 525/397 |
| 4,943,399 | 7/1990 | Taubitz et al. | 264/101 |

FOREIGN PATENT DOCUMENTS

2024729  8/1991  Canada .................................. 71/12

*Primary Examiner*—Ana L. Carrillo
*Attorney, Agent, or Firm*—Keil & Weinkauf

[57] ABSTRACT

In order to prepare thermoplastic molding materials of
A) 5–95% by weight of a modified polyphenylene ether,
B) 5 to 95% by weight of a thermoplastic polyamide,
C) 0 to 25% by weight of an impact-modifying rubber, and
D) 0 to 50% by weight of auxiliaries and/or additives, the components A and B and if necessary the components C and D are fed individually at one or more points into an extruder, mixed with one another, and melted. The component A present in a pulverulent consistency is compacted and/or sintered under pressure and if necessary with the addition of heat, preferably at a pressure corresponding to a nip pressure of 1 to 100 kn/cm to form a porous compact before it is fed into the extruder. The compact is then modified and added as granules to the feed zone of the extruder. In this way the proportion of the fines in the polyphenylene ether is considerably reduced, so that there is virtually no further danger of dust explosions. Further advantages include an improved ease of metering and reduced electrostatic charge.

3 Claims, No Drawings

PREPARATION OF POLYPHENYLENE ETHER/POLYAMIDE MOLDING MATERIALS

The invention relates to a process as classified in the preamble of claim 1.

Thermoplastic molding materials formed from modified polyphenylene ethers and polyamides, which may also contain auxiliaries and/or additives, are known from WO 85/05371, WO 87/05304, EP-A-0 046 040 and EP-A-0 260 123. A pulverulent polyphenylene ether is normally used in their preparation. However, there are considerable safety risks in the large-scale industrial processing of such powders since dust explosions can occur in all the associated transportation and conveying procedures, including the compounding. Furthermore, the finely particulate powder may be electrostatically charged, which considerably complicates the handling and thus the metering of the powder. Finally, the atmospheric oxygen adhering to the finely particulate powder in combination with high processing temperatures not infrequently leads to a partial oxidative decomposition of the polymer and thus to a relatively high impurity of the molding materials.

It is an object of the present invention to provide a process for preparing thermoplastic molding materials that does not suffer from the aforedescribed defects, operates in a product-friendly manner, and in particular enables homogeneous molding materials to be obtained having very good mechanical and thermal properties.

We have found that this object is achieved by the features contained in the defining part of claim 1. The components A to D that are suitable for the process according to the invention are known and are described for example in DE-A-39 29 686.

The pulverulent polyphenylene ether (component A) having a particle size of in general <1 mm is first of all brought into a compact state in a first process step for the processing, i.e. for the metering and feeding into an extruder. This compaction and/or sintering is expediently performed under pressure and if necessary with the addition of heat, preferably under a pressure corresponding to a nip pressure of from 1 to 100 kN/cm, in particular from 5 to 50 kN/cm, and at from about 10° C. to about 150° C., preferably from 20° C. to 50° C..

To this end the pulverulent polyphenylene ether may be subjected for example in a compression mold to a pressure of about 10-200 bar oscillating about 10-20 kHz. The compression is graduated so that a grain boundary adhesion is produced below the crystallite melting point that is sufficient to combine the individual particles to form a granular compact. The compact can be heated up to is the softening point by increasing the oscillator frequency, or alternatively by varying the compression, and can then be comminuted in the solid state.

A continuous compression molding is necessary for processing large amounts of powder. Compactors, for example those from Bepex GmbH, Leingarten, as well as commercially available pelleting presses are suitable for this purpose. Compactors consist essentially of two oppositely rotating rollers and an extruder with a conical hopper and a stuffing screw, via which the rollers are loaded. Depending on the product properties, screws having different compaction behaviors may be used. Sheet-like compacts or compacts in the form of profiles may be continuously produced, which are then comminuted and screened to the desired particle size in further work stages by means of conventional comminution machines, for example disintegrators, and screening devices, for example screen granulators. Screened product is recycled to the compactor. The comminution and screening work stages can be omitted if the pulverulent polyphenylene ether is compression-molded directly into compact particles or agglomerates of the desired size in a pelleting press having appropriate insets. Altogether, particle sizes of from about 1 nm to about 20 mm of the agglomerates prepared in this way have proven particularly suitable for the subsequent processing.

The purpose of the compaction and/or sintering of the pulverulent polyphenylene ether is to remove the air that is still contained in the interstices of the loose powder. Depending on the apparent density of the powder, compaction ratios of from about 1:1.1 to about 1:3 may be necessary, resulting in compacts having a density of about 0.5–1.1 g/cm$^3$.

The compacts are then modified, for example in the manner described in DE-A-39 29 686.

The compaction leads to a marked decrease in the proportion of fine material, with the result that the danger of dust explosions is dramatically reduced. Furthermore, the danger of inhaling polymer dust is also substantially reduced. Further advantages include improved ease of metering and reduced electrostatic charge.

The thus compacted and modified component A is next fed, together with the component B, into a first zone of an extruder. The components A and B are generally added individually at one or more sites to the extruder, which is known per se and is commercially available. Self-cleaning, twin-screw extruders with screws rotating in the same direction and with zonal heating and cooling of the housing are particularly suitable. The screws in this first zone, the length of which is from 2 to 10 times, preferably from 3 to 6 times the screw diameter, are designed to have a conveying action. The first zone may be heated or cooled. In all cases the temperature in this first zone is kept below the melting point of the component A or B, so as to avoid lumping and sticking of the products that are used. If necessary, further, in particular solid mixing constituents in addition to the components A and B may also be fed into this first zone, polymeric additives above all being suitable for this purpose.

The thermoplastically processable polymers from the first zone and any the additives that may have been fed in are conveyed to a second zone into which the components C and D are metered, and all the mixing constituents are mixed with one another and the thermoplastically processable polymers are melted. The feature that the components C and D should be metered into the second zone of the extruder means that the overwhelming proportion of these components is fed into the extruder at this point. The components C and D may also be added to the first zone of the extruder. However, the total amount of the components C and D is metered in preferably at one or more points in the second zone.

The temperature in the second zone of the extruder is maintained sufficiently high so as to effect the melting of the thermoplastically processable polymer and also the homogeneous mixing of the individual constituents, without thereby causing any thermal damage to the products. In general this second zone is heated to temperatures (heating temperature of the extruder) from about 200° C. to about 350° C., preferably from 250° C.

to 300° C., and the temperature is regulated so that the temperature of the melt is at least 5 to 15° C. above the softening point of the mixture. The length of this second zone is generally from 10 to 50 times, preferably from 12 to 36 times the screw diameter. The screws in the rear part of the second zone are designed so as to produce an optimum mixing and homogenization effect. For example, known and conventional screw compounders may be used for the mixing and homogenization, an intensive cross-mixing and a good dispersion effect thereby being achieved by the production of shear force fields of different intensities. It has proved advantageous to use shear rates of from 200 to 1800 sec$^{-1}$, preferably from 350 to 850 sec$^{-1}$. The second zone may also be subdivided into a plurality of sections at different temperatures, so that for example the temperature in the front part, into which the components C and D are fed, is lower than in the rear part, in which the homogenization takes place. Furthermore, this second zone may also be equipped with a degassing pipe in order to remove volatile fractions or auxiliaries.

After the degassing the mixture prepared according to the invention is discharged from the extruder and is then processed further in a conventional manner.

The mean residence time of the products in the extruder is generally from 0.5 to 10 minutes, preferably from 1 to 5 minutes. With longer residence times there is a danger that thermally damaged products will be obtained. Sticking of the products or encrustations of the screw surfaces is avoided by the self-cleaning action of the screws. The use of self-cleaning screws thus contributes substantially to avoiding inhomogeneities in the thermoplastic molding materials.

The molding materials prepared according to the invention may consist of

A) 5-95% by weight of a modified polyphenylene ether,
B) from 5 to 95% by weight of a thermoplastic polyamide,
C) from 0 to 25% by weight of an impact-modifying rubber, and
D) from 0 to 50% by weight of auxiliaries and/or additives, such as mineral fillers, flameproofing agents, etc.

The molding materials have very good mechanical and thermal properties.

EXAMPLES

A twin-screw extruder with three zones (from Werner & Pfleiderer, Stuttgart) was used to carry out the examples. The diameter of the screws, which were tightly meshing and rotating in the same direction, was 53 mm. The components A and B were metered directly into the feed opening of the first zone. The component C was fed cold into the component mixture comprising A and B in the second zone, using a stuffing screw.

The molecular weights were determined by the GPC. method using Shodex separating columns (0.8 50 cm, type A803, A804 and A805) with THF as eluent at room temperature. The polyphenylene ether samples were dissolved in THF under pressure at 110° C. 0.160 ml samples of a 0.25% solution were injected. The detection was performed with a UV detector. The columns were calibrated with polyphenylene ether samples whose absolute molecular weight distributions had been determined by a combination of GPC, laser and light scattering measurements.

The following components were used:

Component A—modified polyphenylene ether

98% by weight of pulverulent poly(2,6-dimethyl-1,4-phenylene ether) with a mean molecular weight of $M_w=30,000$ was modified with 1.95% by weight of fumaric acid and 0.05% by weight of 3,4-dimethyl-3,4-diphenylhexane by mixing at 290°-310° C. in a twin-screw extruder, followed by degassing. The melt was poured into a water bath, granulated and dried.

Component B—polyamide

Polyamide 6,6 (viscosity number according to DIN 53727 in concentrated formic acid: $VN=134$ cm$^3$/g)

Component C—rubber

The four-block rubber Tufprene A from Asahi Chem., with the block sequence S-B-S'-B' having a styrene content of 41% by weight.

Compacting

The above-described polyphenylene ether powder was compacted on a laboratory compactor L 200/50 from Bepex GmbH, Leingarten (screw type 0.75 concave) under the following conditions:

Roller type 6 mm fine profile, roller width 50 mm, roller diameter 200 mm, roller speed 8.4 rpm, roller temperature 25° C., screw speed 34 rpm, product temperature 35° C., nip pressure 11.2 kN/cm, and throughput 40.8 kg/h.

The compact was comminuted by means of a disintegrator and screen granulator to a mean particle size of 0.8 mm.

The properties of the molding materials prepared according to the invention are shown in the tables.

TABLE 1

| No | Component (% by weight) A | B | C | Fumarization (%) | Vicat B (°C.) | DSTA at −30° C. (Nm) | Ductile fracture 0° C. | −20° C. | Impurity content mm$^2$/m$^2$ |
|---|---|---|---|---|---|---|---|---|---|
| 2 | A/42 | 48 | 10 | 0.27 | 198 | 48 | 10 | 7 | 20 |
| 5 | A/44 | 44 | 12 | 0.25 | 193 | 45 | 10 | 8 | 15 |

TABLE 2

Particle size distribution of PPE powder and compact

| | Powder | Compact |
|---|---|---|
| Mean particle size × 50 (μm) | 200 | 800 |
| Weight proportion of the particles < 63 μm (%) | 30 | <5 |

TABLE 3

Particle size distribution

| | PPE powder | Compact |
|---|---|---|
| | % by weight | |
| Particle size < 100 μm | 30 | 5 |
| 100–1000 μm | 66 | 33 |
| 1000–2000 μm | 4 | 26 |
| >2000 μm | 0 | 36 |

TABLE 4

| | Dust explosion susceptibility | |
|---|---|---|
| | PPE powder | PPE compact |
| Dust explosion susceptibility | yes | no |
| Minimum ignition energy (MIE) (mJ) | 10 < MIE < 20 | — |

The following determinations were carried out:
1) Safety data
   Dust explosion susceptibility
   Dust explosion susceptibility in a modified Hartmann tube
   Dust samples were fluidized in concentrations of from 30 to 1000 g/m$^3$ with air in a vertically arranged glass tube (volume about 1.2 liters) closed at the bottom and provided at the top with a loose-fitting flap cover, and an attempt was made to ignite the dust samples. Continuous electrical sparks having an energy of about 4 joules or an incandescent coil having a wire temperature of about 1200° C. were used as ignition source.
   Minimum ignition energy
   The minimum ignition energy is a measure of the ignition sensitivity of dust/air mixtures in the presence of electric sparks.
   For the determination, dust samples in concentrations of from 30 to 1000 g/m$^3$ were fluidized with air in a modified Hartmann apparatus (volume about 1.2 liters) and subjected to a sequence of sparks from capacitor discharges of defined energy.
2) Particle sizes and size distributions by screen analysis according to DIN 53734
3) Impurity determination:
   The impurity level was determined by visually counting the dirt particles in injection molded roundels. The granules used to produce the roundels are dried for 60 minutes at 80° C. The dirt points are counted according to size using a template on one side each of ten roundels (diameter 60 mm) and the results are added. The mean dirt area /m$^2$ is calculated from the summated dirt area.
4) Vicat B dimensional stability at elevated temperature, according to DIN 53460
5) Multiaxial toughness at 23° C. and −30° C. according to DIN 53443
6) Functionality of the polyphenylene ether:

Samples of the polyphenylene ethers functionalized with fumaric acid are dissolved in toluene, precipitated in 5 times the amount of methanol, suction-filtered, and dried. The acid number is then determined by titration with alcoholic NAOH against phenolphthalein. The degree of fumarization (% by weight) of the polyphenylene ether is determined on the basis of the acid number.

7) Ductile fracture behavior:
   The fracture picture was determined visually on the impacted roundels (60×2 mm). 10 roundels were struck for each measurement value and a mean value was obtained from the individual measurements. The number of ductilely broken roundels is given in each case. The fracture picture was classed as ductile if a funnel-shaped bulge produced by plastic deformation formed. The roundels were classed as brittle if they splintered after being struck and exhibited only very slight plastic deformation.

We claim:
1. A process for preparing a thermoplastic molding material of
   A) 5–95% by weight of a polyphenylene ether,
   B) from 5 to 95% by weight of a thermoplastic polyamide,
   C) from 0 to 25% by weight of an impact-modifying rubber, and
   D) from 0 to 50% by weight of additives,
in which the components are fed individually at one or more points into an extruder, mixed with one another, and melted, and the molten mixture is extruded, wherein component A is subjected to at least one process selected from the group consisting of compacting and sintering under pressure to form a porous compact, and the porous compact is added as granules to the feed zone of the extruder.

2. A process as claimed in claim 1, wherein component A is subjected to at least one process selected from the group consisting of compacting and sintering at from about 10° C. to about 150° C. and at a pressure coersponding to a nip pressure of from 1 to 100 kN/cm.

3. The process of claim 1, wherein heat is added to component A during the formation of the porous compact.

* * * * *